(No Model.) 2 Sheets—Sheet 1.
J. R. SEVERANCE.
FEEDING MECHANISM FOR GRAIN BINDERS.
No. 452,458. Patented May 19, 1891.
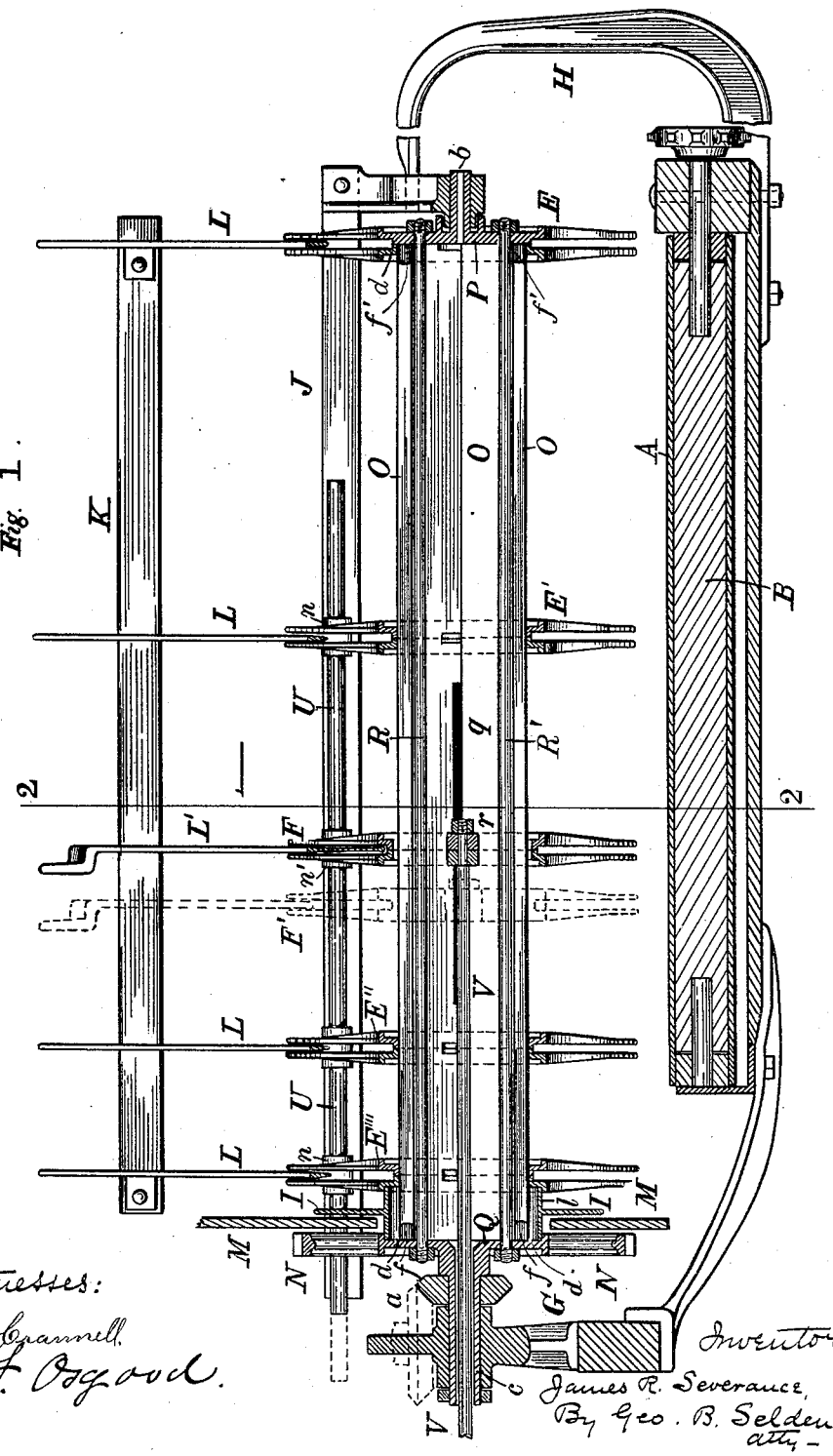

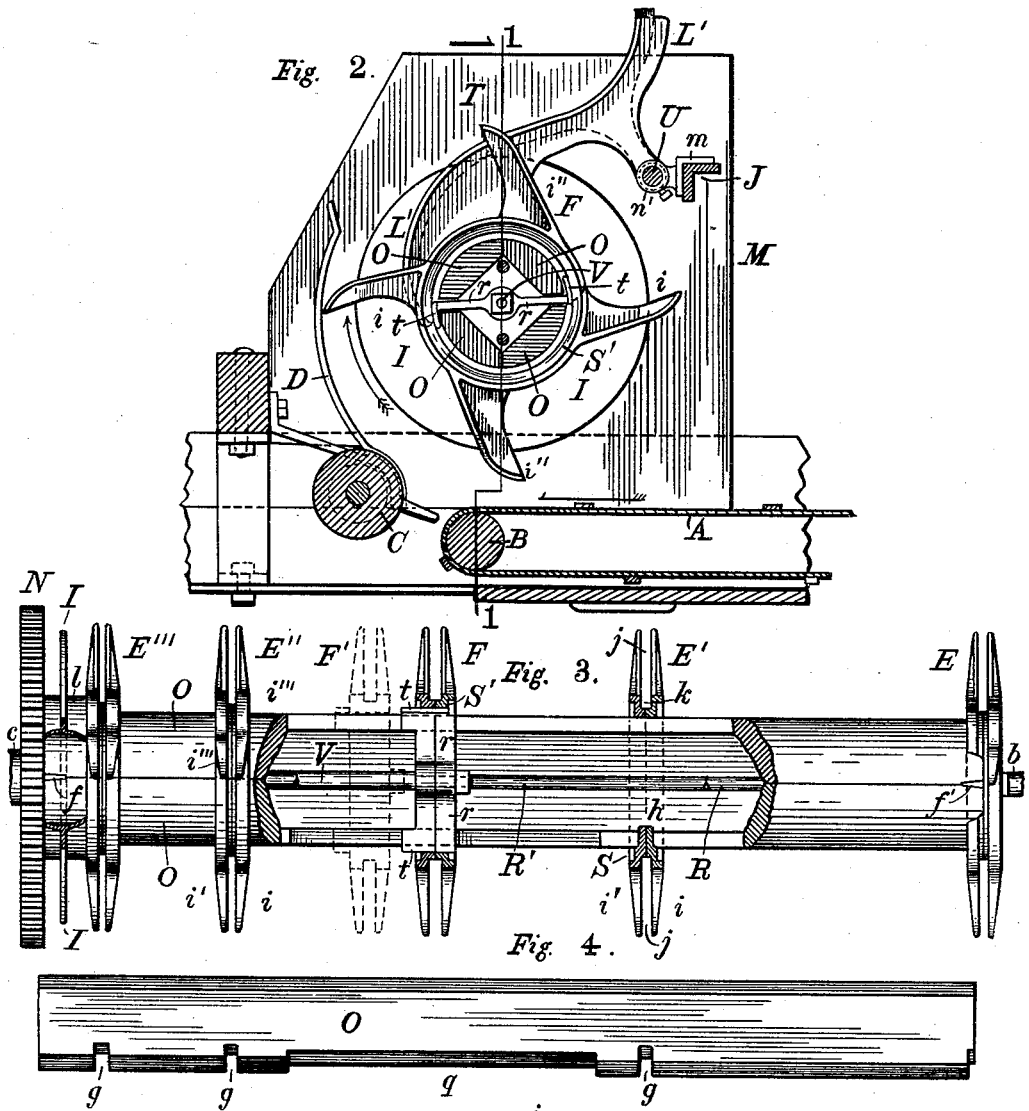

UNITED STATES PATENT OFFICE.

JAMES R. SEVERANCE, OF POUGHKEEPSIE, NEW YORK.

FEEDING MECHANISM FOR GRAIN-BINDERS.

SPECIFICATION forming part of Letters Patent No. 452,458, dated May 19, 1891.

Application filed September 8, 1890. Serial No. 364,273. (No model.)

*To all whom it may concern:*

Be it known that I, JAMES R. SEVERANCE, a citizen of the United States, residing at Poughkeepsie, in the county of Dutchess, in the State of New York, have invented certain Improvements in Feeding Mechanism for Grain-Binders, of which the following is a specification, reference being had to the accompanying drawings.

My improvements in feeding mechanism for grain-binders are designed to be used in connection with machines of the type represented in my pending application, Serial No. 344,111, filed March 17, 1890; but they are capable of use in other relations and in different styles of machines.

My improvements are fully described and illustrated in the following specification and accompanying drawings, the novel features thereof being specified in the claims annexed to the said specification.

In the accompanying drawings, representing my improvements in feeding mechanism for grain-binders, Figure 1 is a central longitudinal vertical section of the revolving feeder on the line 1 1, Fig. 2, showing some of the adjacent parts of the harvester in elevation. Fig. 2 is a transverse section of the feeder-drum and adjacent parts on the line 2 2, Fig. 1, showing the parts to the left hand of said line in elevation. Fig. 3 is an elevation of the feeder-drum detached, the drum being partially broken away to show the interior construction. Fig. 4 represents one of the staves constituting the drum detached, as seen from the inside. Fig. 5 is a transverse section of the feeder-drum, showing the staves in section and one of the feeders in elevation.

In the accompanying drawings I have represented the construction of my improved feeding mechanism as arranged in place for use on a grain-binder of the type shown in my said application, Serial No. 344,111. The feeder is arranged lengthwise of the machine at the inner end of the grain-platform, and is driven by suitable connecting devices from the operating mechanism of the harvester, so as to feed the cut grain upward into the gaveling-chamber, from which it is transferred to the binding-table by the binder-arm, as described in my previous patents and in the said application, Serial No. 344,111.

A represents the grain-conveyer, which may be of any suitable or preferred construction; B, the roller at the inner end of the conveyer; C, the clearance-roller, and D the fingers or grain-guides.

E E' E'' E''' F are the revolving feeders, the feeder F, which is located opposite the binder-arm, being made adjustable lengthwise, as indicated by the dotted lines F'.

G is a standard arising from the frame of the harvester and supporting the front end of the feeder, and H a curved arm or bracket which sustains the rear end of the feeder.

I is a revolving disk located at the front end of the feeder.

J is a bar extending lengthwise of the feeder and arranged to support the clearer-bars L.

K, Fig. 1, is a slat or grain-guard supported by the clearer-bars.

M is an end board extending across the front end of the gaveling-chamber, and N is a spur-gear, through which the revolving feeder receives motion.

$a$, Fig. 1, represents a pair of bevel-gears by which the reel is driven.

The feeder-drum consists of a series of wooden staves secured together by heads at their ends, connected by suitable tie-rods inside the staves. The heads are conveniently formed integral with the feeder and gear at the ends of the drum, and the heads are provided with projecting journals which revolve in suitable boxes on the standards which support the feeding mechanism.

In the accompanying drawings the drum is represented as constructed of four staves O O; but any other preferred number may be used.

P, Fig. 1, represents the head at the rear end of the drum, and Q, Fig. 1, the head at the front end. The tie-rods R R' connect the heads together, being provided at one or both ends with nuts by which the heads are drawn up firmly against the ends of the staves.

The head P, which is preferably formed in one piece with the feeder E, is provided with the journal $b$, which revolves in a suitable box supported by the standard H, which, as indicated, is curved outward to afford room for the passage of the heads of long grain.

The central part of the driving-gear N at the forward end of the feeding apparatus forms the head Q, which is provided with the journal c, arranged to revolve in a box on the standard G. The heads are provided with inwardly-projecting circular flanges d, of a diameter equal to that of the drum and forming a recess into which the ends of the staves are inserted. The edges of the staves are dressed on radial lines, so that they bear against and support each other in place. At the forward end the head Q is provided with means—such as one or more screws, lugs, or projections—for preventing the staves from slipping in the recess.

In order to compel the staves to revolve with the head such means may consist of a wedge or wedges f, Fig. 3, projecting inward between the ends of the staves at one or more of the joints between the staves. These wedges are conveniently cast with the head. At the rear end of the feeder similar wedges f', Fig. 3, may be used, though their use in this place is not so necessary as that the forward head should be provided with some positive means of driving the drum.

In order to cause the stationary feeders E' E'' E'', to revolve with the drum, notches g g g, Fig. 4, are cut in the edges of two of the staves, and the feeders are provided with the lugs h h, Fig. 5, projecting inward radially into the notches. These lugs are preferably formed integrally with the feeders, which consist of a ring S, Fig. 5, having the projecting teeth i i' i'' separated by a slot j, into which the lower ends of the clearer-bars enter, a circumferential groove k, Fig. 3, being cast around the ring S to receive the points of the bars. The feeders may be formed in one piece, or, as indicated in Fig. 3, they may be made in halves, the lugs h being cast on each half, so that the parts are held together by the notches in the staves.

The feeder-teeth are made of different inclinations, in order to facilitate the removal of the grain from the gaveling-chamber T, Fig. 2, by the binder-arm, as described in my said pending application, Serial No. 344,111.

Between the feeder E''' at the front end and the head the enlarged drum l is placed, to the exterior surface of which the revolving butt-disk I is attached. These parts are conveniently made of sheet-iron, the drum l being fitted into recesses formed by circular flanges on the feeder E''' and the head Q. An opening is made through the end board M sufficient to admit the drum l.

The clearer-bars are attached to the bar J by means of the brackets m, Fig. 2, the rod U being supported parallel to the axis of the feeding-cylinder by the eyes n, formed in the clearer-bars.

The clearer-bar L' of the movable feeder F is fastened to the rod U, the rod being arranged to slide through the eyes n on the other clearer-bars. The movable feeder F is placed nearly opposite the binder-arm, and it is connected with the binding mechanism so as to be adjusted therewith by means of the rod V, which passes centrally through the head at one end of the feeding apparatus.

The adjustable feeder F is provided with the projecting teeth and constructed the same as the stationary feeders, except that it is provided with one or more radial arms r, Fig. 2, which extend inward from the ring S', and constitute the means of connection with the rod V. This feeder may also be divided or made in halves. The radial arms r pass through slots q q, made in the staves or by cutting away one edge of two of the staves along the joint. The rod V is fastened to the arms by a nut or other suitable device. The ring S' of the adjustable feeder is preferably made of a diameter somewhat greater than that of the drum, so that it may move easily thereon, being provided along the slots q with the bearing-plates t, which slide along the outer surface of the drum when the feeder is moved and sustain it in the proper position. The feeder may, however, be made to slide on the drum without the bearing-plates t.

The parts constituting my improved feeding apparatus are readily assembled by placing the feeders in position on the notched staves and then sliding the smooth staves lengthwise into place, after which the heads are secured to the staves by the rods R R'.

My improved feeding mechanism is cheap in construction, easy to repair, and operates satisfactorily in practical use, as I have demonstrated by trial on an extended scale.

I claim—

1. In a cylindrical rotary feeder for a grain-binder, the combination of the notched staves, the intermediate staves, the toothed feeder-rings having lugs to fit the notches in the staves, one or more longitudinal tie-rods, and the flanged heads connected by the tie rod or rods, substantially as described.

2. The combination, in a rotary feeding mechanism of a grain-binder, of the staves and heads forming the drum, the toothed rings secured to the drum, and the adjustable feeder arranged to slide thereon, substantially as described.

3. The combination, in the rotary feeding mechanism of a grain-binder, of the revolving slotted drum constructed of the staves and the heads at the ends of the drum, the toothed rings secured to the drum, the adjustable feeder arranged to slide thereon and provided with one or more radial arms passing through the slot or slots on the drum, and the central rod for adjusting the feeder, substantially as described.

4. The combination, in the rotary feeding mechanism of a grain-binder, of the revolving slotted drum constructed of the notched staves and the heads at the ends of the drum, the toothed rings provided with internal lugs fitting the notches in the staves, the adjustable feeder having one or more radial arms passing through the slot or slots in the drum, and the central rod for adjusting the feeder, substantially as described.

5. The combination, in the rotary feeding mechanism of a grain-binder, of the revolving drum consisting of the staves and the front and rear heads, the front head being provided with wedges adapted to enter the joints between the staves, and the tie rod or rods connecting the heads together, substantially as described.

6. The combination, in the rotary feeding mechanism of a grain-binder, of the drum consisting of the staves and the heads at each end of the drum, the said heads being provided with wedges adapted to be forced into the joints between the staves, and the tie rod or rods connecting the heads together, substantially as described.

7. The combination, in the rotary feeding mechanism of a grain-binder, of the revolving slotted drum consisting of the staves and the heads at each end of the drum, one of the heads being provided with a hollow journal, the toothed rings attached to the drum, the adjustable feeder arranged to slide on the drum and provided with one or more radial arms passing through the slot or slots in the drum, and the central adjusting-rod connected to the adjustable feeder and passing through the hollow journal, substantially as described.

JAMES R. SEVERANCE.

Witnesses:
GEO. B. SELDEN,
C. G. CRANNELL.